United States Patent
Mo et al.

(10) Patent No.: US 9,262,211 B2
(45) Date of Patent: Feb. 16, 2016

(54) APPARATUS AND METHOD FOR SOFTWARE MIGRATION IN MOBILE ENVIRONMENT

(75) Inventors: Sang-Dok Mo, Hwaseong-si (KR); Sung-Min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 159 days.

(21) Appl. No.: 13/427,331

(22) Filed: Mar. 22, 2012

(65) Prior Publication Data

US 2013/0124675 A1 May 16, 2013

(30) Foreign Application Priority Data

Nov. 10, 2011 (KR) .......................... 10-2011-0117185

(51) Int. Cl.
G06F 15/16 (2006.01)
G06F 9/48 (2006.01)
G06F 9/46 (2006.01)

(52) U.S. Cl.
CPC .............. G06F 9/4856 (2013.01); G06F 9/461 (2013.01)

(58) Field of Classification Search
CPC ...................................................... G06F 9/4856
USPC ........................................................ 709/217
See application file for complete search history.

(56) References Cited

U.S. PATENT DOCUMENTS

| | | | |
|---|---|---|---|
| 8,027,354 B1* | 9/2011 | Portolani et al. | 370/431 |
| 8,473,557 B2* | 6/2013 | Ramakrishnan et al. | 709/206 |
| 2002/0129126 A1 | 9/2002 | Chu et al. | |
| 2003/0074386 A1* | 4/2003 | Schmidt et al. | 709/1 |
| 2004/0098419 A1* | 5/2004 | Bantz et al. | 707/203 |
| 2005/0210401 A1 | 9/2005 | Ketola et al. | |
| 2006/0026587 A1 | 2/2006 | Lemarroy et al. | |
| 2006/0101084 A1* | 5/2006 | Kishi et al. | 707/200 |
| 2006/0212746 A1* | 9/2006 | Amegadzie et al. | 714/6 |
| 2007/0011669 A1* | 1/2007 | Varma et al. | 717/168 |
| 2007/0245332 A1* | 10/2007 | Tal et al. | 717/168 |
| 2008/0080514 A1* | 4/2008 | Louzoun et al. | 370/394 |
| 2009/0154709 A1* | 6/2009 | Ellison | 380/282 |
| 2010/0257328 A1* | 10/2010 | Liu | 711/162 |
| 2010/0299666 A1* | 11/2010 | Agbaria et al. | 718/1 |
| 2011/0078681 A1 | 3/2011 | Li et al. | |
| 2011/0246714 A1* | 10/2011 | Zhou et al. | 711/112 |
| 2011/0296052 A1* | 12/2011 | Guo et al. | 709/240 |
| 2012/0054409 A1* | 3/2012 | Block et al. | 711/6 |
| 2012/0137285 A1* | 5/2012 | Glikson et al. | 718/1 |
| 2014/0137125 A1* | 5/2014 | Hsu | 718/102 |

FOREIGN PATENT DOCUMENTS

| | | |
|---|---|---|
| KR | 10-2006-0043734 A | 5/2006 |
| KR | 10-2011-0035949 A | 4/2011 |

* cited by examiner

*Primary Examiner* — Hamza Algibhah
(74) *Attorney, Agent, or Firm* — NSIP Law

(57) ABSTRACT

Provided is an apparatus for software migration between devices in a mobile environment. The software migration apparatus may include a policy manager configured to select a migration method for target software according to a migration environment, and a migration manager configured to perform migration of the target software according to the migration method. In addition, provided herein is a software migration method which is performed in a mobile environment. The software migration method may involve analyzing a current migration environment, selecting a migration method according to the analyzed current migration environment, and performing the migration of the target software.

18 Claims, 8 Drawing Sheets

APPARATUS AND METHOD FOR SOFTWARE MIGRATION IN MOBILE ENVIRONMENT

CROSS-REFERENCE TO RELATED APPLICATION

This application claims the benefit under 35 U.S.C. §119(a) of a Korean Patent Application No. 10-2011-0117185, filed on Nov. 10, 2011, in the Korean Intellectual Property Office, the entire disclosure of which is incorporated herein by reference for all purposes.

BACKGROUND

1. Field

The following description relates generally to a technique for software migration between a plurality of devices in a mobile environment.

2. Description of the Related Art

The development of software migration techniques between devices has mainly been aimed at techniques for saving energy in a server environment. However, with the recent popularization of personal mobile devices and the increasing accessibility to the Internet, a Machine-to-Machine (M2M) environment has been established and the interest in N-screen services is also increasing. In order to keep up with this trend, a new software migration technology that is capable of satisfying various migration conditions in a mobile environment is necessary. For software migration, conventionally, Post-Copy Migration and Pre-Copy Migration techniques have been used. With the Post-Copy Migration technique, in response to a software migration request, the software migration is performed in such a way as to stop the execution of software that is to be migrated; then, only the minimal necessary memory is copied and the software in a target device is resumed. Any additional required memory is copied whenever a page fault occurs. Accordingly, the Post-Copy Migration is characterized by low operating performance.

On the other hand, in response to a user's request for software migration, in the Pre-Copy Migration technique, the software migration is performed by copying the entire memory of the target software to a target device while a source device continues to execute the target software. However, with the Pre-Copy Migration technique, because a large amount of memory is copied without considering various migration environments such as the network state, the migration cost and the like, the required total migration time can be greatly increased; thus, the Pre-Copy Migration technique may result in an excessive data charge for the user due to an extended time of wireless network use.

SUMMARY

In one general aspect, there is provided a software migration apparatus which may be used in a mobile environment, the apparatus including a policy manager that may be configured to select a migration method for target software according to a migration environment and a migration manager that may be configured to perform the migration of the target software according to the selected migration method.

The policy manager may select basic copying, duplicate copying, control transfer or a combination thereof as the migration method according to a current migration environment.

The basic copying technique may include a method of transmitting one or more images of the target software from an image server to the target device, a method of using, in response to the images of the target software existing in the target device, the images of the target software, a method of transmitting a snapshot regarding a memory state of the target software from the source device to the target device, or a combination thereof. The method of basic copying that is used may be selected according to the current migration environment.

In response to the policy manager selecting the method of transmitting the images of the target software from the image server to the target device, the migration manager may receive authentication information from the image server and transmit the authentication information and address information of the image server to the target device.

The duplicate copying may involve a method of transmitting a snapshot regarding a changed memory state of the target software to the target device, a method of transmitting an event log related to the target software to the target device, or a combination thereof. The method of the duplicate copying may be selected according to the current migration environment.

The control transfer may involve a method of stopping execution of the target software in the source device after migration to the target device, a method of transmitting changed memory data or an event log to the target device after stopping execution of the target software in the source device and then migrating to the target device, or a combination thereof. The method of control transfer may be selected according to the current migration environment.

The software migration apparatus may further include an event logger configured to record and manage an event log related to the target software and to create a snapshot regarding a memory state of the target software according to a request from the migration manager.

The event log may include a user input related to the target software, a network communication, a display event, or a combination thereof.

The target software may include an application or operating system (OS) that is operating in the source device.

In addition, the software migration apparatus may be a smart phone, a notebook, an ARM server, or a smart TV.

In another general aspect, there is provided a software migration method which is performed in a mobile environment. The software migration method may involve the steps of analyzing a current migration environment, selecting a migration method for target software according to the analyzed current migration environment, and performing migration of the target software according to the migration method.

The selecting of the migration method may involve selecting basic copying, duplicate copying, control transfer or a combination thereof as the migration method according to the analyzed current migration environment.

The basic copying may include a method of transmitting one or more images of the target software from an image server to the target device, a method of using, in response to the images of the target software existing in the target device, the images of the target software, a method of transmitting a snapshot regarding a memory state of the target software from the source device to the target device, or a combination thereof. The method of the basic copying may be selected according to the analyzed current migration environment.

The performing of the migration may involve receiving authentication information from the image server and transmitting the authentication information and address information of the image server to the target device in response to the method of transmitting the images of the target software from the image server to the target device being selected.

The duplicate copying may involve a method of transmitting a snapshot regarding a changed memory state of the target software to the target device, a method of transmitting an event log related to the target software to the target device, or a combination thereof. The method of duplicate copying may be selected according to the current migration environment.

The control transfer may involve a method of stopping the execution of the target software in the source device after the migration to the target device, a method of transmitting changed memory data or an event log to the target device after stopping the execution of the target software in the source device and then migrating to the target device, or a combination thereof. The method of the control transfer may be selected according to the current migration environment.

In another general aspect, there is provided a software migration method which is performed in a mobile environment, the method involving selecting a migration method for target software according to an analysis of a current migration environment, and performing migration of the target software according to the selected migration method. This software migration method may be performed by a smart phone, a notebook, an ARM server, or a smart TV.

In yet another general aspect, there is provided a non-transitory computer readable recording medium storing instructions to cause a software migration apparatus to perform a software migration in a mobile environment. The instructions stored in the recording medium may cause a software migration apparatus to analyze a current migration environment, select a migration method for target software according to the analyzed current migration environment, and perform the migration of the target software according to the selected migration method.

Figure 1:
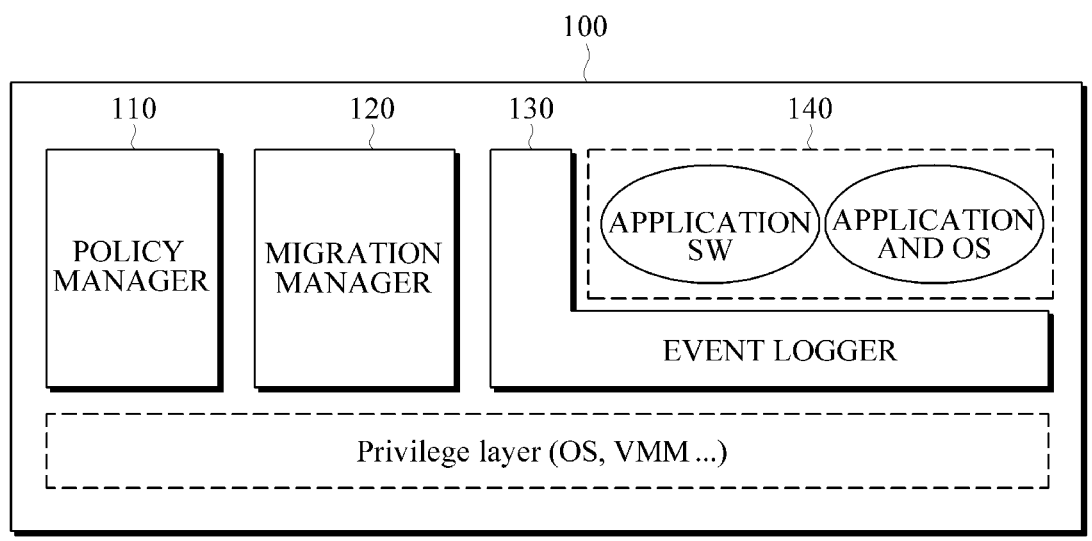
FIG. 1 is a diagram illustrating an example of a software migration apparatus that is used in a mobile environment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Descriptions of some well-known functions and constructions have been omitted for increased clarity and conciseness. It is understood that the features of the present disclosure may be embodied in different forms and should not be constructed as limited to the examples set forth herein. Rather, these embodiments are provided so that this disclosure will be thorough and complete, and will convey the full scope of the present disclosure to those skilled in the art. The drawings may not be necessarily to scale, and, in some instances, proportions may have been exaggerated in order to clearly illustrate features of the embodiments.

Hereinafter, examples of an apparatus and method for software migration in a mobile environment will be described in detail with reference to the drawings. The software migration apparatus may be applied to various information appliances and IT products, such as a smart phone, a notebook, an ARM server, a smart TV, etc.

FIG. 1 is a diagram illustrating an example of a software migration apparatus 100 that is used in a mobile environment. Referring to FIG. 1, the software migration apparatus includes a policy manager 110 and a migration manager 120. The policy manager 110 selects a migration method for target software 140 in consideration of various migration environments. The various migration environments that may be considered include device environments such as the agedness of the device, whether the device is outdated, computing capability, network state, battery power state and the like of the corresponding device, and the user's purposes and considerations for the migration such as whether the cost for migration has to be minimized, whether the migration has to be performed without changing or losing the current state of target software like games, whether a time taken for the migration has to be minimized, whether the use of a network has to be minimized and the like.

The policy manager 110 may select an optimal migration method by analyzing the current migration environments in consideration of such various migration environments. A migration method that can be selected by the policy manager basically may include three methods: basic copying, duplicate copying, and control transfer. More specifically, the policy manager may select an optimal migration method by selecting one technique that is most suitable for the current migration environments from among the basic copying, the duplicate copying, and the control transfer, or by appropriately combining two or more techniques of the basic copying, the duplicate copying, and the control transfer. The basic copying technique involves copying the basic binary images of target software being executed in a source device to a target device in response to a software migration request. The duplicate copying technique involves making a software environment of a target device nearly identical to that of a source device. The control transfer technique allows a user who has used a source device to use a target device.

The migration manager 120 performs the migration of the target software 140 from the source device to the target device according to the migration method selected by the policy manager 110. The migration manager 120 executes and manages all tasks for actually performing the migration. For example, the migration manager 120 performs the operations of copying a memory or event from the source device to the target device, of stopping or resuming the target software 140 and the like. Meanwhile, the target software 140 that is to be migrated may include any one or both of an application and OS, wherein the application and OS may be in the form of a Virtual Machine (VM).

According to another aspect, the software migration apparatus 100 may further include an event logger 130. The event logger 130 may record and manage event logs about the target software 140, and create a snapshot regarding a memory state of the target software 140 in response to a request from the migration manager 120. The event logs may include user inputs associated with the target software 140, a network communication, a display event, etc. However, the above-mentioned event logs are only exemplary, and the event logs have to be interpreted to include all events required for resuming the target software 140 in the target device after the migration.

As illustrated in FIG. 1, the policy manager 110, the migration manager 120, and the event logger 130 may be disposed on a user level of the software migration apparatus 100. However, it is also possible that the policy manager 110, the migration manager 120, and the event logger 130 are disposed on a SW layer such as a Privilege layer (OS or VMM (Virtual Machine Monitor)) or across a user level and a Privilege layer.

Figure 2:
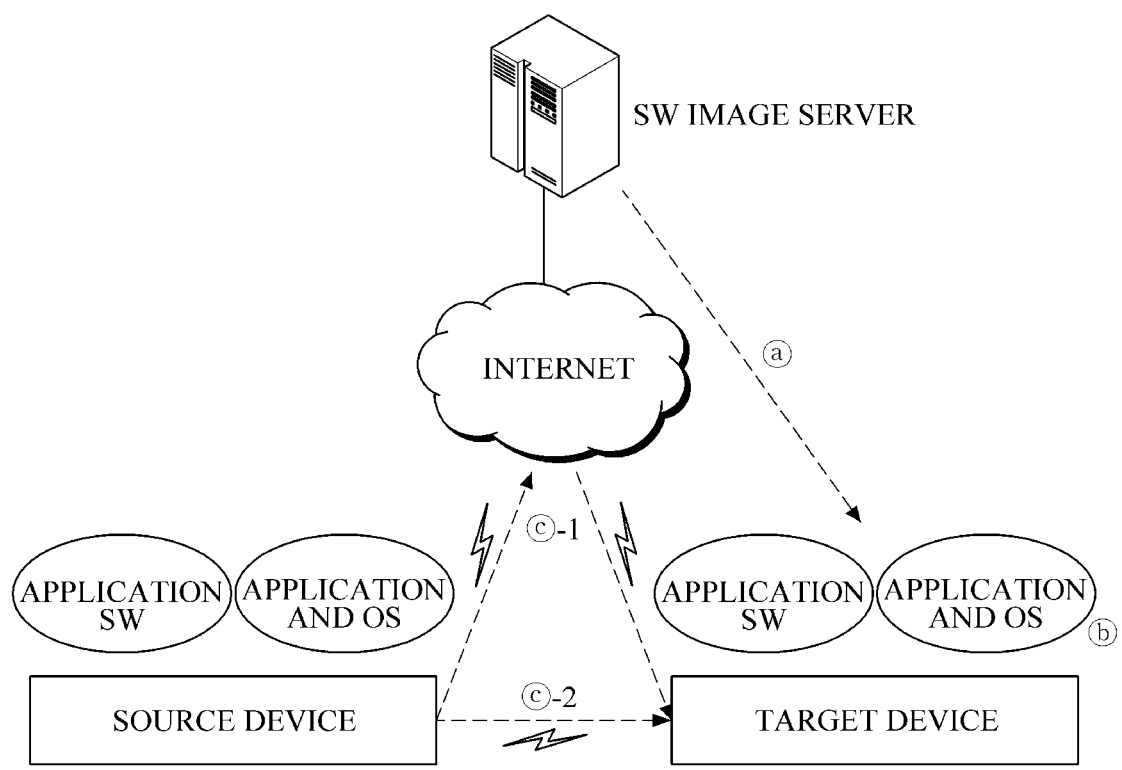
FIG. 2 is a diagram illustrating an example of a basic copying technique.

FIG. 2 illustrates the basic copying technique. The basic copying technique may involve copying the basic binary images of target software to a target device in response to a software migration request by a user. The basic copying technique may be classified into three discrete operations: ⓐ an image server transmitting images of a target software from an image server to a target device ⓑ; the target device using the images of the target software in the event that the images of the target software already exists in the target device; and ⓒ a source device transmitting a snapshot regarding a memory state of the target software to the target device. Here, the image server may be a kind of application store or a dedicated image server for the migration. Also, the operation ⓒ where the source device transmits the snapshot regarding the memory state of the target software to the target device may be conducted through the Internet (ⓒ-1) or through a direct connection between the source device and the target device (ⓒ-2). Here, the snapshot may be created by the event logger 130 according to a request from the migration manager 120 (see FIG. 1).

The policy manager 110 may analyze the current migration environments such as the purpose of migration, a network connection state, a network bandwidth, the remaining battery power, the computing capability of the corresponding device and the like to thereby select one of the three operations of the basic copying technique. For example, in the event that a high-performance server is using a high-speed wired network, copying all images of target software from a source device to a target device would not pose a problem; however, in a mobile environment based on a low-speed wireless network, copying all images of target software adds a large amount of overhead to the corresponding mobile devices, which may significantly lower the migration speed. Accordingly, in such a migration environment, selecting the operation ⓐ where an image server transmits images of target software to a target device may be preferable. The image server may receive the basic images of target software from a source device or directly from a provider of the target software, and store them therein. Since the operation copies images of the target software through a communication with a high-performance image server and without any communication with a source device, it may be possible to rapidly copy all images of target software with such an apparatus.

In the event that the policy manager 110 selects the operation ⓐ where an image server transmits images of target software to a target device, the migration manager 120 may receive the authentication information from the image server and transmit the authentication information and address information of the image server to the target device. The target device may access the corresponding image server using the authentication information and the address information to download images of the target software. In the event that the operation ⓑ in which the target device uses, if basic images of the target software already exist therein, the images of the target software is selected, it is unnecessary to copy all images of the target software.

Figure 3:
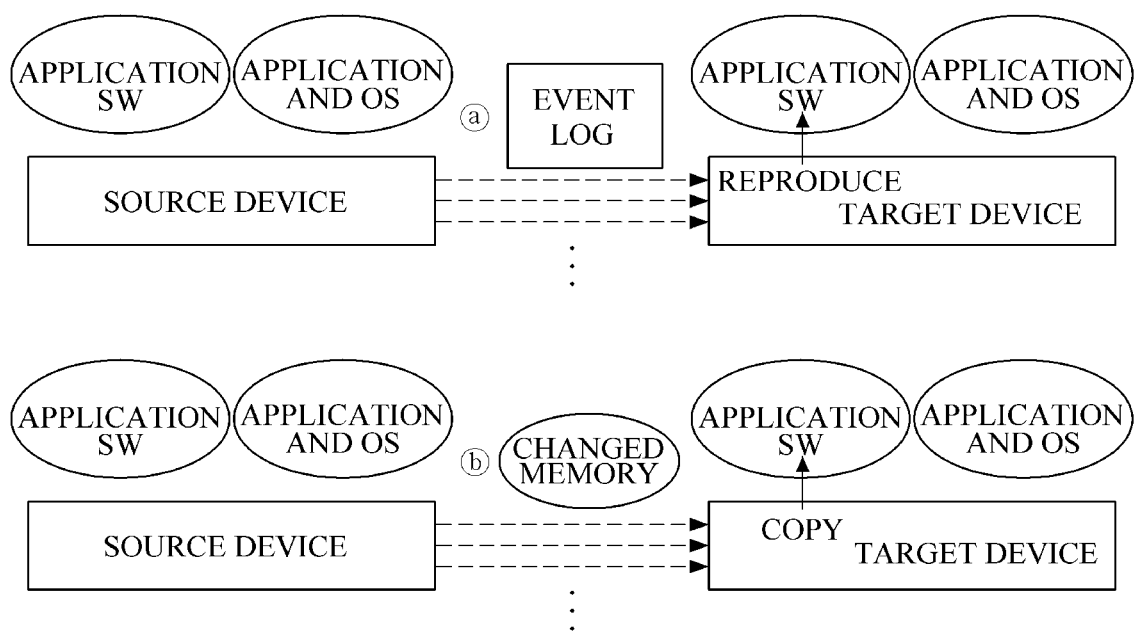
FIG. 3 is a diagram illustrating an example of a duplicate copying technique.

FIG. 3 illustrates the duplicate copying technique. The duplicate copying technique involves making a target software environment of a target device nearly identical to that of a source device, and may, for example, be classified into two discrete operations: ⓐ transmitting an event log related to target software to a target device; and ⓑ transmitting a snapshot regarding a changed memory state of target software to a target device.

The policy manager 110 may select an operation suitable for an analyzed current migration environment from among the two operations of the duplicate copying technique, or may appropriately combine the two operations. In the operation ⓐ of transmitting an event log related to target software to a target device, the event log may be newly generated by a source device and recorded by the event logger 130 (see FIG. 1) after the previous event log is transmitted from the source device to the target device. The target device may reproduce the target software based on the received event log so that the target software can be maintained in the nearly same state as in the source device. As such, by transmitting only the event log instead of copying the memory of target software, the amount of data that is transmitted through the wireless network can be minimized; thus, it is possible to significantly reduce the data charge related to the use of the wireless network as well as the total migration time. In addition, the operation ⓐ of transmitting the event log to the target device can transmit a small amount of data compared to the operation ⓑ of transmitting the snapshot regarding the changed memory state of target software to the target device.

Figure 4:
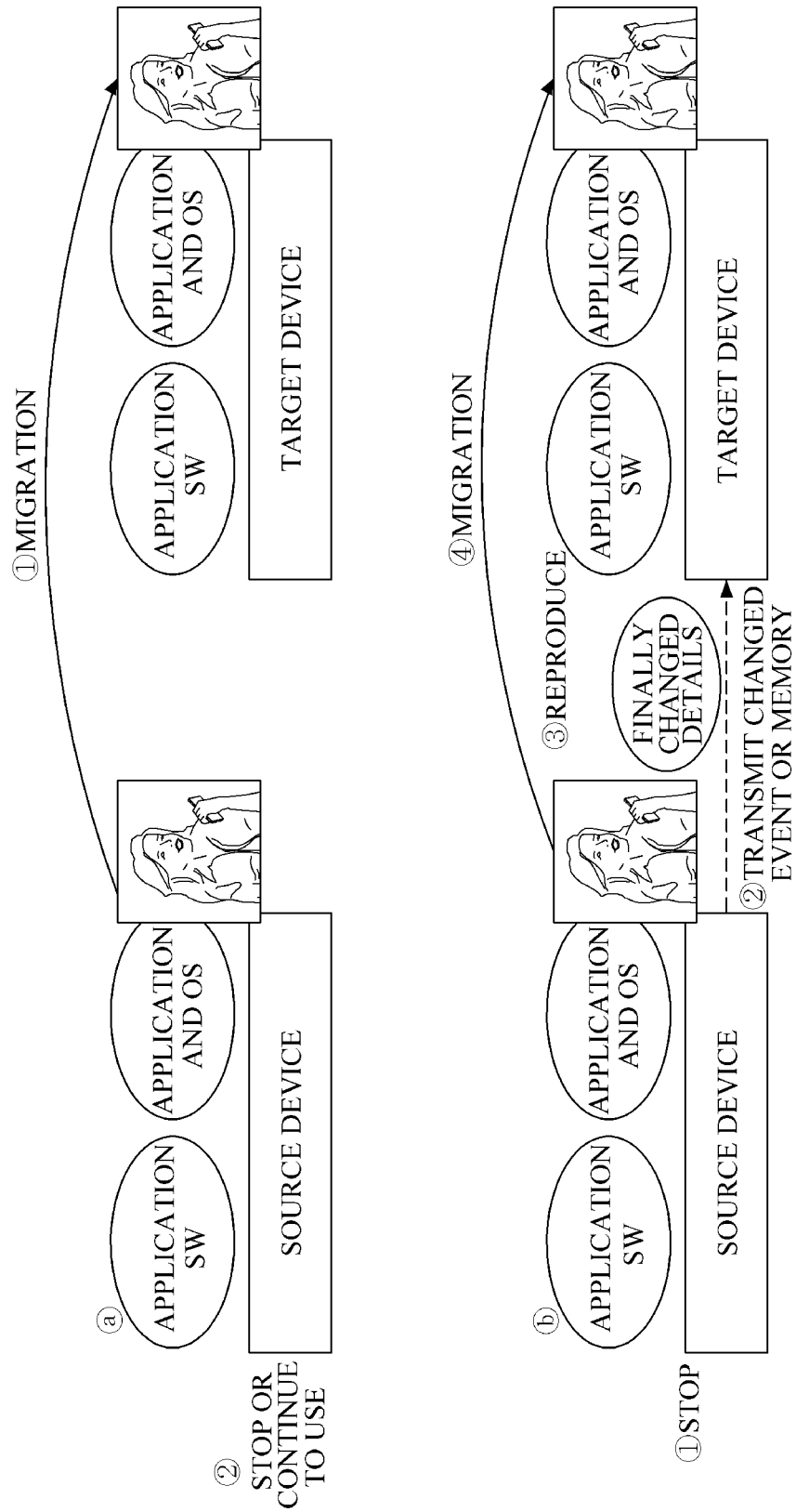
FIG. 4 is a diagram illustrating an example of a control transfer technique.

FIG. 4 illustrates the control transfer technique. The control transfer technique involves allowing a user who has used a source device to use a target device; the control transfer technique, for example, may be classified into two discrete operations ⓐ and ⓑ. The policy manager 110 (see FIG. 1) may select an operation that is suitable for the analyzed current migration environments from among the two operations ⓐ and ⓑ of the control transfer technique.

The operation ⓐ involves allowing a user to continue to use the target software after migrating to the target device in response to the target software already operating in a target device and thereafter to cause a source device to stop the execution of the target software. The operation ⓑ involves allowing a user to stop the execution of target software in a source device before the migration to a target device and to transmit a snapshot regarding previously changed details such as a changed event log or a changed memory state to the target device, to thereafter make the target software environment of the target device identical to that of the source device based on the changed event log or memory state, and then to resume the target software in the target device so that the user can continue to use the target software in the target device.

Figure 5:
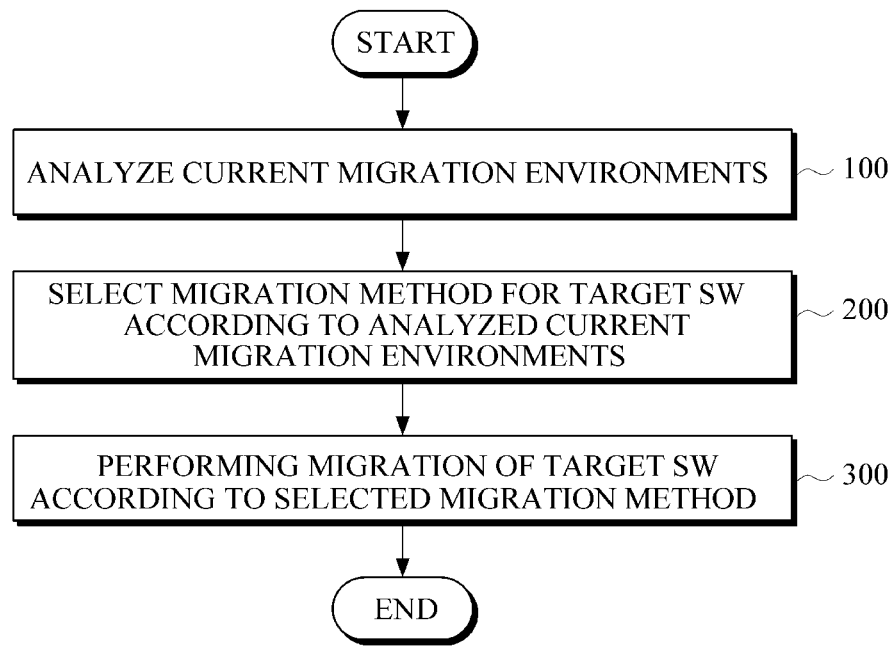
FIG. 5 is a flowchart illustrating an example of a software migration method.

FIG. 5 is a flowchart illustrating an example of a software migration method, wherein the software migration method is performed in a mobile environment. The following description will be given with reference to FIGS. 1 and 5. First, the current migration environments are analyzed (100). The policy manager 110 may perform the operation of analyzing the current migration environments in order to select an optimal migration method for target software 140 in the mobile environment. Here, the current migration environments may include device environments such as the agedness of the device, computing capability, network state, battery power state and the like of the corresponding device, and the user's purposes and considerations for the migration such as whether a cost for migration has to be minimized, whether the migration has to be performed without changing or damaging the current state of target software like games, whether a time taken for the migration has to be minimized, whether the use of a network has to be minimized and the like.

Then, a migration method for the target software 140 may be selected according to the analyzed migration environments (200). The policy manager 110 may analyze the current migration environments to select an optimal migration method according to the results of the analysis. At this time, the policy manager 110 may select the optimal migration method by selecting one technique that is most suitable for the analyzed migration environments from among the basic copying, the duplicate copying, and the control transfer, or by optimally combining two or more techniques of the basic copying, the duplicate copying, and the control transfer.

The basic copying technique involves copying all basic binary images of target software to a target device in response to the software migration request by a user; the basic copying technique may, for example, be classified into three discrete operations: ⓐ an image server transmitting the images of target software from an image server to a target device ⓑ; the target device using the images of the target software in response to the images of the target software already existing in the target device; and ⓒ a source device transmitting a snapshot regarding a memory state of the target software to the target device. Here, the image server may be a kind of application store or a dedicated image server for migration. Also, the operation ⓒ where the source device transmits the snapshot regarding the memory state of the target software to the target device may be conducted through the Internet (ⓒ-1) or through a direct connection between the source device and the target device (ⓒ-2).

The duplicate copying technique involves making the target software environment of a target device nearly identical to that of a source device; the technique may, for example, be classified into two discrete operations: ⓐ transmitting an event log related to target software to a target device; and ⓑ transmitting a snapshot regarding a changed memory state of target software to the target device.

The policy manager 110 may select an operation suitable for the current migration environments from among the two operations of the duplicate copying technique, or may appropriately combine the two operations.

The control transfer technique involves allowing a user who has used a source device to use a target device; the control transfer technique may, for example, be classified into two discrete operations ⓐ and ⓑ. The policy manager 110 may select an operation that is suitable for the analyzed migration environments from among the two operations ⓐ and ⓑ of the control transfer technique.

The operation ⓐ involves allowing a user to continue to use the target software after migrating to the target device in response to the target software already being operated in a target device and thereafter to cause a source device to stop the execution of the target software. The operation ⓑ may involve allowing a user to stop the execution of the target software in a source device before migrating to a target device and transmitting a snapshot regarding previously changed details, such as a changed event log or a changed memory state, to the target device, to thereafter make the target software environment of the target device identical to that of the source device based on the changed event log or memory state; then, the target software in the target device may be resumed so that the user can continue to use the target software in the target device.

The policy manager 110 may select one technique from among the basic copying, the duplicate copying, and the control transfer, or appropriately combine two or more techniques of the basic copying, the duplicate copying, and the control transfer, according to the analyzed migration environments, to thereby decide an optimal migration method.

Finally, the target software is migrated according to the migration method (300). The migration manager 120 performs migration of the target software 140 from the source device to the target device according to the migration method selected by the policy manager 110.

Figure 6:
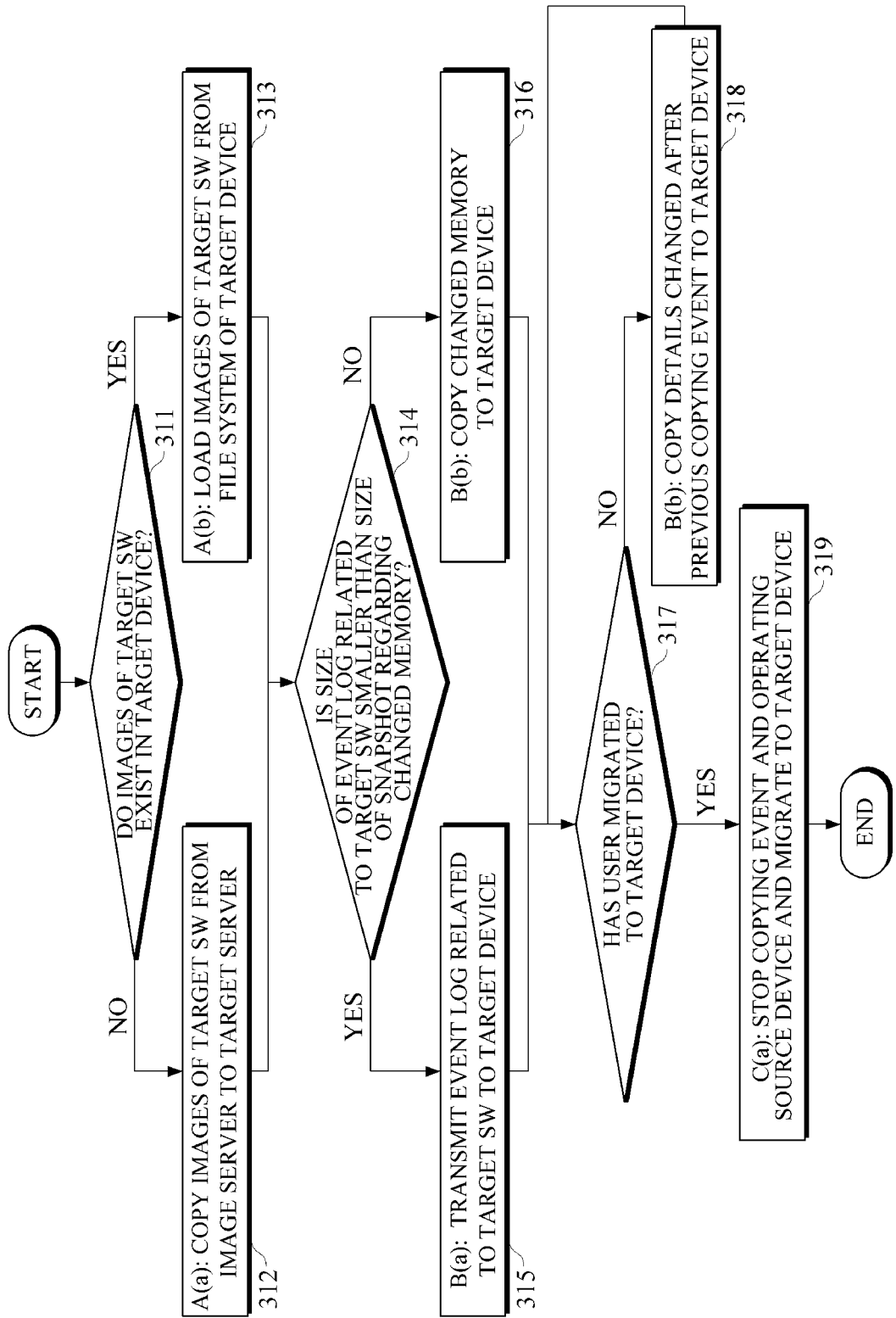
FIG. 6 is a flowchart illustrating an example of a software migration procedure.

Hereinafter, the procedures for the software migration will be described with reference to FIGS. 6, 7, and 8. FIG. 6 is a flowchart illustrating an example of a software migration procedure, wherein the software migration procedure can be applied to the case where a user wants to perform the migration at a low cost. That is, in response to the analyzed current migration environments requiring the minimization of communication between a source device and a target device and the user's decision to use the target software in the target device although the target software environment of the target device is slightly different from that of the source device, the specific software migration procedure may be selected by the policy manager 110 (see FIG. 1) and performed by the migration manager 120. The policy manager 110 may set a migration procedure according to the current migration environments, in the order of: basic copying (A)->duplicate copying (B)->control transfer (C), and select operations for each of the basic copying, duplicate copying, and control transfer, to thereby decide an optimal migration method, then, the migration manager 120 may perform the migration according to the selected migration method, which will be described in detail later.

First, in order to minimize the amount of communication between a source device and a target device, it may be checked whether images of the target software exist in the target device (311). In the event that the images of the target software already exist in the target device, the images of the target software stored in the target device may be loaded (A(b): 313). Meanwhile, in the event that no image of target software exists in the target device, images of the target software may be received from an image server and then transmitted to the target device (A(a): 312). Then, it may be determined whether the size of an event log related to the target software is smaller than the size of a snapshot regarding a changed memory (314). In the event that the size of the event log is smaller than the size of the snapshot, an event log related to the target software, which has been generated until this point in time since the basic copying was performed, is transmitted to the target device (B(a): 315). On the contrary, in the event that the size of the event log is equal to or larger than the size of the snapshot, a snapshot regarding a memory state of the target software, which has been changed until this point in time since the basic copying event, is transmitted to the target device (B(b): 316).

Finally, since the software migration procedure can be applied even to the case where the target software environment of the target device is not completely identical to that of the source device, the source device may stop the transmission of changed details (an event log or a memory snapshot) to the target device such that the user can continue to use the target software in the target device (C(a): 319). At this time, it may be checked whether the user has migrated to the target device until the final operation of the control transfer is completely performed (317); in the event that the user has not migrated to the target device, operations of the duplicate copying may be selected and performed repeatedly in order to make the target software environment of the target device maximally identical to that of the source device (318).

Figure 7:
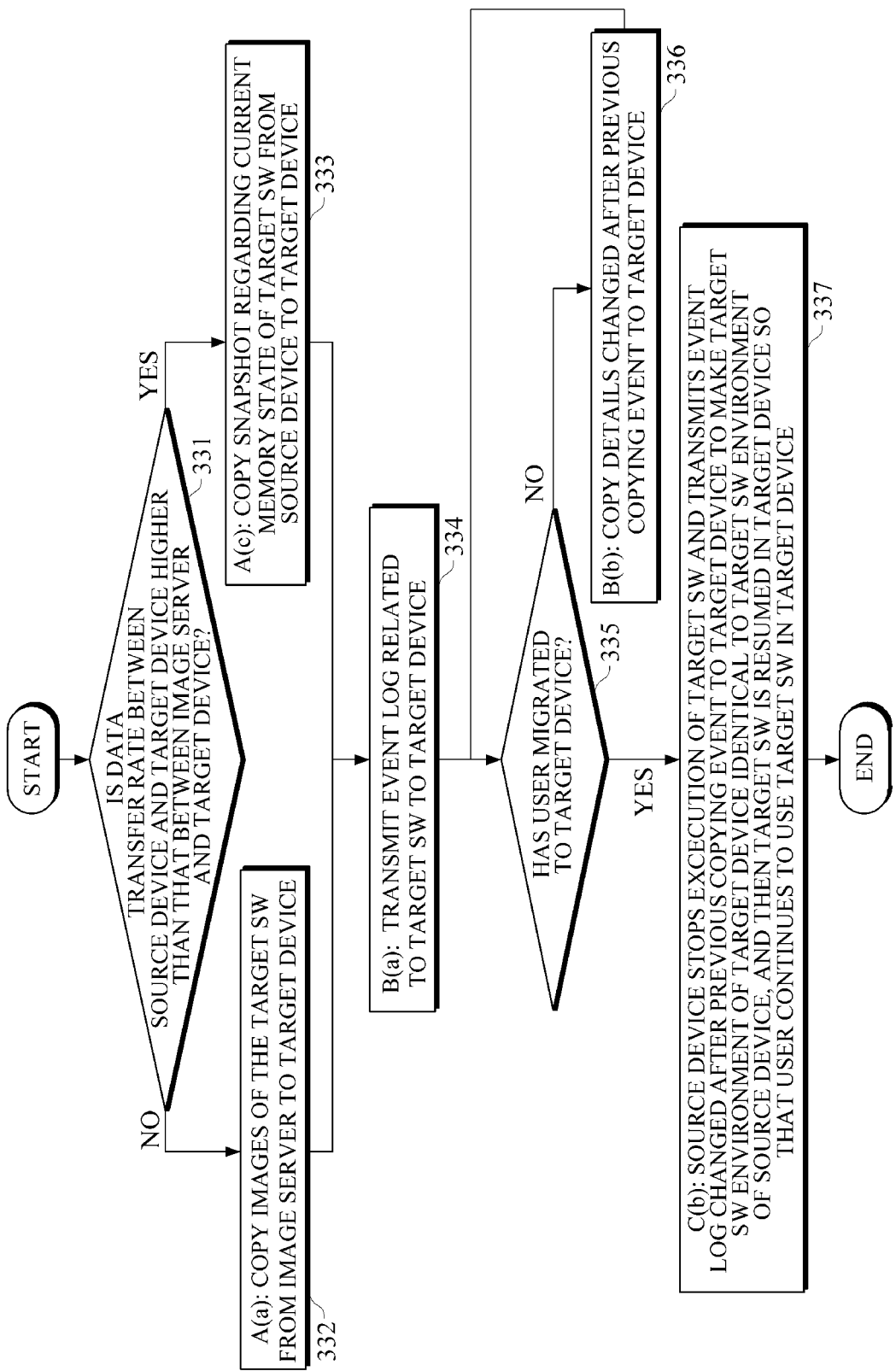
FIG. 7 is a flowchart illustrating another example of a software migration procedure.

FIG. 7 is a flowchart illustrating another example of a software migration procedure. The software migration procedure can be applied to the case where a user wants to move game software from TV to a smart phone without changing or losing the current state of the game software, etc. That is, in the event that the analysis of the current migration environments reveals that a high-speed home wireless LAN can be used and a user decided to use the target software in a target device in the state where the target software environment of the target device is completely identical to that of a source device, the specific software migration procedure can be selected by the policy manager 110 and performed by the migration manager (see FIG. 1). The policy manager 110 may combine a migration procedure according to current migration environments, in the order of: basic copying (A)->duplicate copying (B)->control transfer (C), and select the specific operations for each of the basic copying, duplicate copying, and control transfer, to thereby decide a migration method; and then, the migration manager 120 may perform the migration according to the selected migration method.

First, it may be determined whether a data transfer rate between the source device and the target device is higher than that between an image server and the target device (331). In the event that the data transfer rate between the source device and the target device is equal to or lower than that of between the image server and the target device, the images of the target software may be transmitted from the image server to the target device (A(a): 332). However, in the event that the data transfer rate between the source device and the target device is higher than that between the image server and the target device, a snapshot regarding a current memory state of the target software may be transmitted from the source device to the target device (A(c): 333). Then, an event log related to the target software that has been generated until this point in time after the basic copying event is transmitted to the target device (B(a): 334).

Finally, since the current migration environments correspond to the case where a user wants to use the target software in the target device in the state where the target software environment of the target device is completely identical to that of the source device, the source device may stop the execution of the target software and transmit an event log changed after the previous copying event to the target device to make the target software environment of the target device identical to that of the source device; then, the target software may be resumed in the target device so that the user can continue to use the target software in the target device (C(b): 337). At this time, it may be checked whether the user has migrated to the target device until the final operation of the control transfer is completely performed (335). In the event that the user has not migrated to the target device, operations of the duplicate copying may be selected and performed repeatedly in order to make the target software environment of the target device maximally identical to that of the source device (B(b): 336).

Figure 8:
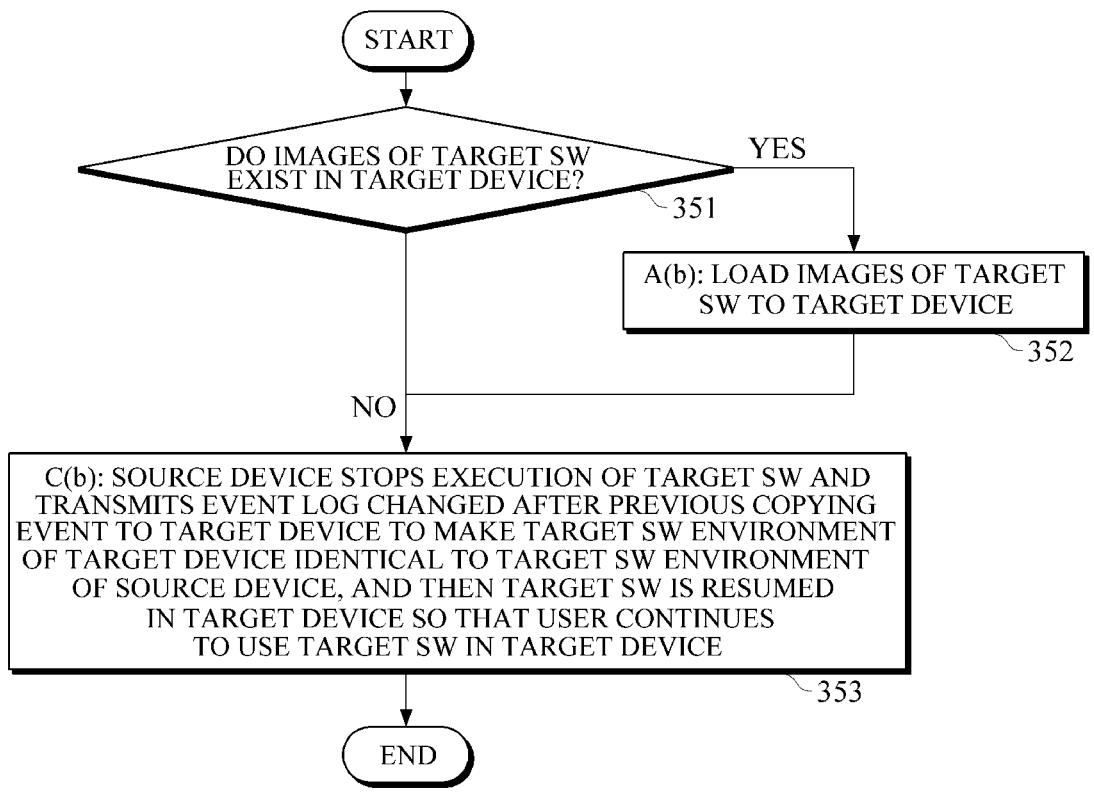
FIG. 8 is a flowchart illustrating yet another example of a software migration procedure.

FIG. 8 is a flowchart illustrating another example of a software migration procedure. The software migration procedure may be applied to the case where an aged sensor is replaced with a new one. That is, the current migration environments correspond to the case where a source device and a target device are low-performance devices and a user wants to use the target software in the target device in the state where the target software environment of the target device is completely identical to that of the source device. In other words, in the case where it is not important that the target software is stopped for a long time in the source device, the software migration procedure may be selected by the policy manager 110 and performed by the migration manager 120 (see FIG. 1). The policy manager 110 may combine a migration procedure according to the current migration environments, in the order of: basic copying (A)->control transfer (C), and select operations for each of the basic copying and control transfer to thereby decide on a migration method. Then, the migration manager 120 may perform the migration according to the determined migration method.

First, the target device may determine whether the images of the target software exist therein (351). In the event that the images of the target software exist in the target device, the images of the target software stored in the target device may be loaded (A(b): 352). Then, since the current migration environments correspond to the case where a user wants to use the target device in the state where the target software environment of the target device is completely identical to that of the source device, or to the case where it is not important that the target software is stopped for a long time in the source device, the duplicate copying (B) may be omitted; the source device may stop the execution of the target software and transmit an event log changed after the previous copying event to the target device to make the target software environment of the target device identical to that of the source device. After that, the target software is resumed in the target device so that the user can continue to use the target software in the target device (C(b): 353). In the event that no images of the target software exist in the target device, the operation C(b) of the control transfer may be directly performed (353).

It is noted that, the software migration method and procedures based on migration environments, as described above with reference to FIGS. 6, 7, and 8, are only exemplary, and the software migration method and procedures may be more variously expanded according to various mobile environments and various migration environments.

By automatically selecting an optimal migration method suitable for the current migration conditions in various mobile environments and by performing the migration according to the optimal migration method, it is possible to rapidly perform the migration while stably maintaining a system.

A software migration apparatus may be a mobile device. As a non-exhaustive illustration only, a mobile device may refer to a cellular phone, a personal digital assistant (PDA), a digital camera, a portable game console, and an MP3 player, a portable/personal multimedia player (PMP), a handheld e-book, a portable labtop PC, a global positioning system (GPS) navigation, a tablet, a sensor, and devices such as a desktop PC, a high definition television (HDTV), an optical disc player, a setup box, a home appliance and the like that are capable of wireless communication or network communication consistent with that which is disclosed herein.

As a non-exhaustive illustration only, software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A migration apparatus which is used in a mobile environment, the apparatus comprising:
   a memory to store target software;
   a policy manager configured to select an order of basic copying, duplicate copying, and control transfer from a combination thereof as a migration method for the target software according to a current migration environment, wherein the current migration environment comprises at least one of a state of a source device, a state of a target device, and a state of a network connecting the source device and the target device; and
   a migration manager configured to perform migration of the target software according to the selected migration method,
   wherein
      the basic copying comprises copying one or more images of the target software to the target device,
      the duplicate copying comprises making a software environment of the target device nearly identical to a software environment of the source device, and
      the control transfer allows a user who has used the source device to use the target device.

2. The migration apparatus of claim 1, wherein the basic copying comprises: a method of transmitting the one or more images of the target software from an image server to the target device; a method of using, in response to the images of the target software existing in the target device, the images of the target software; a method of transmitting a snapshot regarding a memory state of the target software from the source device to the target device; or a combination thereof, the method of basic copying being selected according to the current migration environment.

3. The migration apparatus of claim 2, wherein, in response to the policy manager selecting the method of transmitting the images of the target software from the image server to the target device, the migration manager receives authentication information from the image server and transmits the authentication information and address information of the image server to the target device.

4. The migration apparatus of claim 1, wherein the duplicate copying comprises: a method of transmitting a snapshot regarding a changed memory state of the target software to the target device, a method of transmitting an event log related to the target software to the target device, or a combination thereof, the method of the duplicate copying being selected according to the current migration environment.

5. The migration apparatus of claim 1, wherein the control transfer comprises: a method of stopping execution of the target software in the source device after migration to the target device, a method of transmitting changed memory data or an event log to the target device after stopping execution of the target software in the source device and then migrating to the target device, or a combination thereof, the method of control transfer being selected according to the current migration environment.

6. The migration apparatus of claim 1, further comprising an event logger configured to record and manage an event log related to the target software and to create a snapshot regarding a memory state of the target software according to a request from the migration manager.

7. The migration apparatus of claim 6, wherein the event log includes a user input related to the target software, a network communication, a display event, or a combination thereof.

8. The migration apparatus of claim 1, wherein the target software includes an application or operating system (OS) that is operating in the source device.

9. The migration apparatus of claim 1, wherein the software migration apparatus is a smart phone, a notebook, an ARM server, or a smart TV.

10. A migration method which is performed in a mobile environment, comprising:
    analyzing a current migration environment comprising at least one of a state of a source device, a state of a target device, and a state of a network connecting the source device and the target device;
    selecting an order of basic copying, duplicate copying, and control transfer from a combination thereof as a migration method for target software according to the analyzed current migration environment; and
    performing migration of the target software according to the migration method,
    wherein
       the basic copying comprises copying one or more images of the target software to the target device,
       the duplicate copying comprises making a software environment of the target device nearly identical to a software environment of the source device, and
       the control transfer allows a user who has used the source device to use the target device.

11. The migration method of claim 10, wherein the basic copying comprises: a method of transmitting the one or more images of the target software from an image server to the target device; a method of using, in response to the images of the target software existing in the target device, the images of the target software; a method of transmitting a snapshot regarding a memory state of the target software from the source device to the target device; or a combination thereof, the method of the basic copying being selected according to the analyzed current migration environment.

12. The migration method of claim 11, wherein the performing of the migration comprises receiving authentication information from the image server and transmitting the authentication information and address information of the image server to the target device in response to the method of transmitting the images of the target software from the image server to the target device being selected.

13. The migration method of claim 10, wherein the duplicate copying comprises: a method of transmitting a snapshot regarding a changed memory state of the target software to the target device, a method of transmitting an event log related to the target software to the target device, or a combination thereof, the method of duplicate copying being selected according to the current migration environment.

14. The migration method of claim 10, wherein the control transfer comprises: a method of stopping execution of the target software in the source device after migration to the target device, a method of transmitting changed memory data or an event log to the target device after stopping execution of the target software in the source device and then migrating to the target device, or a combination thereof, the method of the control transfer being selected according to the current migration environment.

15. A migration method which is performed in a mobile environment, the method comprising:
    selecting an order of basic copying, duplicate copying, and control transfer from a combination thereof as a migration method for target software according to an analysis of a current migration environment comprising at least one of a state of a source device, a state of a target device, and a state of a network connecting the source device and the target device; and
    performing migration of the target software according to the selected migration method,
    wherein
        the basic copying comprises copying one or more images of the target software to the target device,
        the duplicate copying comprises making a software environment of the target device nearly identical to a software environment of the source device, and
        the control transfer allows a user who has used the source device to use the target device.

16. The migration method of claim 15, wherein the software migration method is performed by a smart phone, a notebook, an ARM server, or a smart TV.

17. A non-transitory computer readable recording medium storing instructions that causes a software migration apparatus to perform a software migration in a mobile environment, the instructions comprising:
    analyzing a current migration environment comprising at least one of a state of a source device, a state of a target device, and a state of a network connecting the source device and the target device;
    selecting an order of basic copying, duplicate copying, and control transfer from a combination thereof as a migration method for target software according to the analyzed current migration environment; and
    performing migration of the target software according to the migration method,
    wherein
        the basic copying comprises copying one or more images of the target software to the target device,
        the duplicate copying comprises making a software environment of the target device nearly identical to a software environment of the source device, and
        the control transfer allows a user who has used the source device to use the target device.

18. The software migration apparatus of claim 1, wherein the current migration environment comprises at least one of the following:
    an agedness of the source device and the target device;
    a computing capability of the source device and the target device;
    a network state of the source device and the target device; and
    a battery power state of the source device and the target device.

* * * * *